J. M. PUSEY.
Thill-Couplings.
No. 143,929.　　　　　　　　　　Patented Oct. 21, 1873.
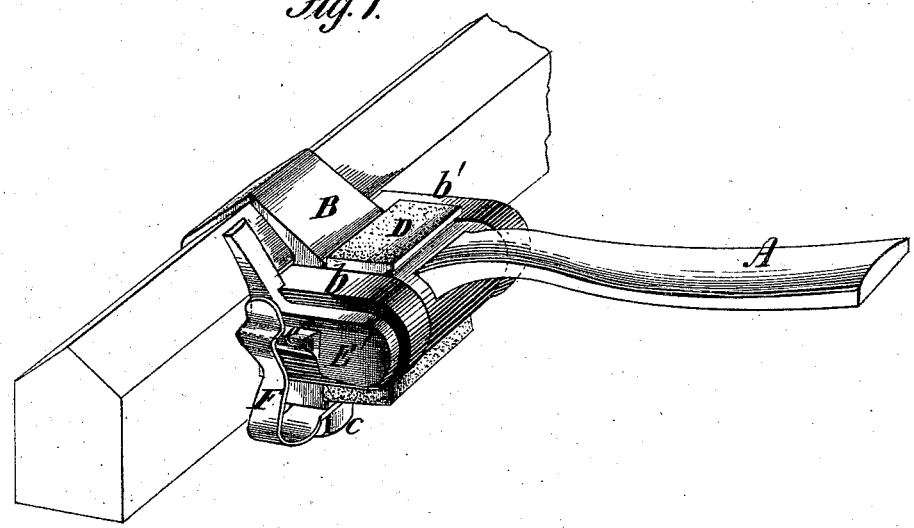
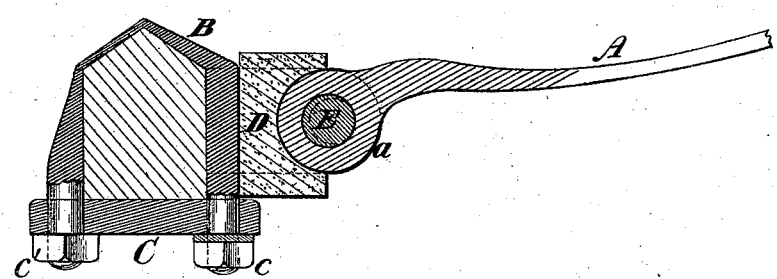
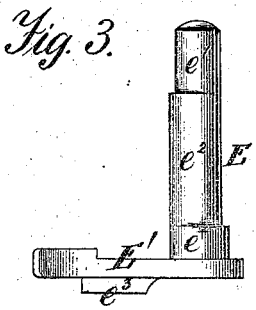

UNITED STATES PATENT OFFICE.

JOSEPH M. PUSEY, OF WILMINGTON, DELAWARE.

IMPROVEMENT IN THILL-COUPLINGS.

Specification forming part of Letters Patent No. 143,929, dated October 21, 1873; application filed September 8, 1873.

*To all whom it may concern:*

Be it known that I, JOSEPH M. PUSEY, of Wilmington, in the county of New Castle and State of Delaware, have invented certain new and useful Improvements in Thill-Couplings; and I do hereby declare the following to be a full, clear, and exact description of the invention, such as will enable others skilled in the art to which it pertains to make and use it, reference being had to the accompanying drawings, which form part of this specification.

This invention relates to that class of thill and pole couplings in which the rattling, and consequent rapid wear, of the joint is prevented by a compressed rubber spring so acting upon the thill or pole iron that the pintle of the joint will be constantly held in firm contact therewith, and with its bearings in the lugs of the clip. To facilitate the rapid connection and disconnection of the couplings in exchanging a thill for a pole, and vice versa, it is very desirable to so construct the parts that their junction can be effected before compressing the spring. Many means have been provided to accomplish this end, but none have hitherto been devised which combined the requisite simplicity of construction with adaptability to couplings already on the market or in use to commend themselves to the trade and the public for general adoption. My improvement, intended to supply this want, consists in the employment, with the ordinary clip and knuckle, of the thill or pole iron of a pin, the stem of which, where it passes through the thill or pole iron, is eccentric to its journals, which have their bearings in the lugs of the clip. Thus made, the pin can be inserted through the thill or pole iron, while the latter barely touches the rubber spring or cushion; and by subsequently turning it half of a revolution its eccentric stem will force said iron against the rubber, and compress it to the required extent. The pin is also provided with a handle, which operates, in conjunction with a spring-catch, to lock the bolt after the coupling has been effected, as heretofore stated.

In the annexed drawings, Figure 1 is a perspective view of a thill-coupling embodying my improvements. Fig. 2 is a longitudinal section of the same. Fig. 3 is a detail view of the pin.

The same letters of reference are used in all the figures in the designation of identical parts.

The thill or pole iron A terminates in the ordinary transverse, cylindrical, and tubular knuckle $a$, which fits snugly between the lugs $b$ and $b'$ of the clip B, which is of the usual construction, and clamped to the front axle of a vehicle by means of the plate C and nuts $c$ and $c'$. The rubber spring or cushion D, resembling in form the brass of a journal-box, is fitted between the lugs of the clip so as to bear with its flat side against the adjacent leg of the clip, and present its concaved side toward the knuckle of the thill-iron. The clip and thill-iron are connected or pivoted together by the pin E, whose journals $e$ and $e^1$, having their bearings respectively in the lugs $b$ and $b'$ of the clip, are concentric, while that part of its stem marked $e^2$, on which the thill-iron turns, is eccentric, as clearly illustrated in Fig. 3. The part $e$ of the pin is of a somewhat larger, and the part $e^1$ of a somewhat smaller, diameter than the eccentric portion $e^2$, and the eyes in the lugs $b$ and $b'$ are made of corresponding size. The outer journal $e^1$ of the pin is not only of less size than the eccentric part $e^2$, but it is also so made that its surface does not project beyond the surface of said eccentric part; and hence the pin can be passed endwise through the lugs of the clip and the eye of the thill-iron, which would be impossible if both journals of the pin were either smaller or larger than its eccentric part. In consequence of this construction of the bolt it can be applied to the ordinary thill-coupling, in which the thill-iron has an enlargement at the end, with a hole bored transversely through it. The rubber spring is so proportioned in thickness that it will permit the insertion of the pin through the thill-iron, with its knuckle barely touching the rubber, when the swell of the eccentric points away from the rubber. After the pin has been thus inserted it is turned a half-revolution, causing its eccentric portion $e^2$ to force the thill-iron against the rubber, suitably compressing it, the throw of the eccentric being made sufficient to accomplish this. The force which the rubber spring exerts upon the thill-iron will always be uniform under all ordinary oscillations of the shaft or pole. The large end of the pin is provided with a handle, E', by which it is manipulated, and which, when turned back, as shown in Fig. 1, so that the eccentric of the pin forces the thill-iron against the rubber spring, bears with its upturned end against the axle, and is locked in that position by a spring-catch, F, which, being with one end fastened to the clip or axle, hooks with its other bent end over a lateral projection, $e^3$, on the handle, as clearly illustrated in Fig. 1.

Other and different means may be devised for locking the pole than those described.

What I claim as my invention, and desire to secure by Letters Patent, is—

1. The clip B $b$ $b'$, rubber spring D, and thill or pole iron A $a$, in combination with the pin E, having an eccentric part, $e^2$, and concentric journals $e$ and $e^1$, one of which is of greater, the other of less, diameter than the eccentric part, substantially as and for the purpose specified.

2. In a thill-coupling of the character stated, the eccentric pin E $e$ $e^1$ $e^2$, provided with a handle, E' $e^3$, in combination with the spring-catch F, substantially as and for the purpose specified.

In testimony that I claim the foregoing I have hereunto set my hand this 6th day of September, 1873.

JOSEPH M. PUSEY.

Witnesses:
SAML. D. SMITH,
ALBERT W. SMITH.